E. CORY.
BROOM CORN CLEANING MACHINE.
APPLICATION FILED DEC. 14, 1910.
1,064,617.
Patented June 10, 1913.
3 SHEETS—SHEET 1.
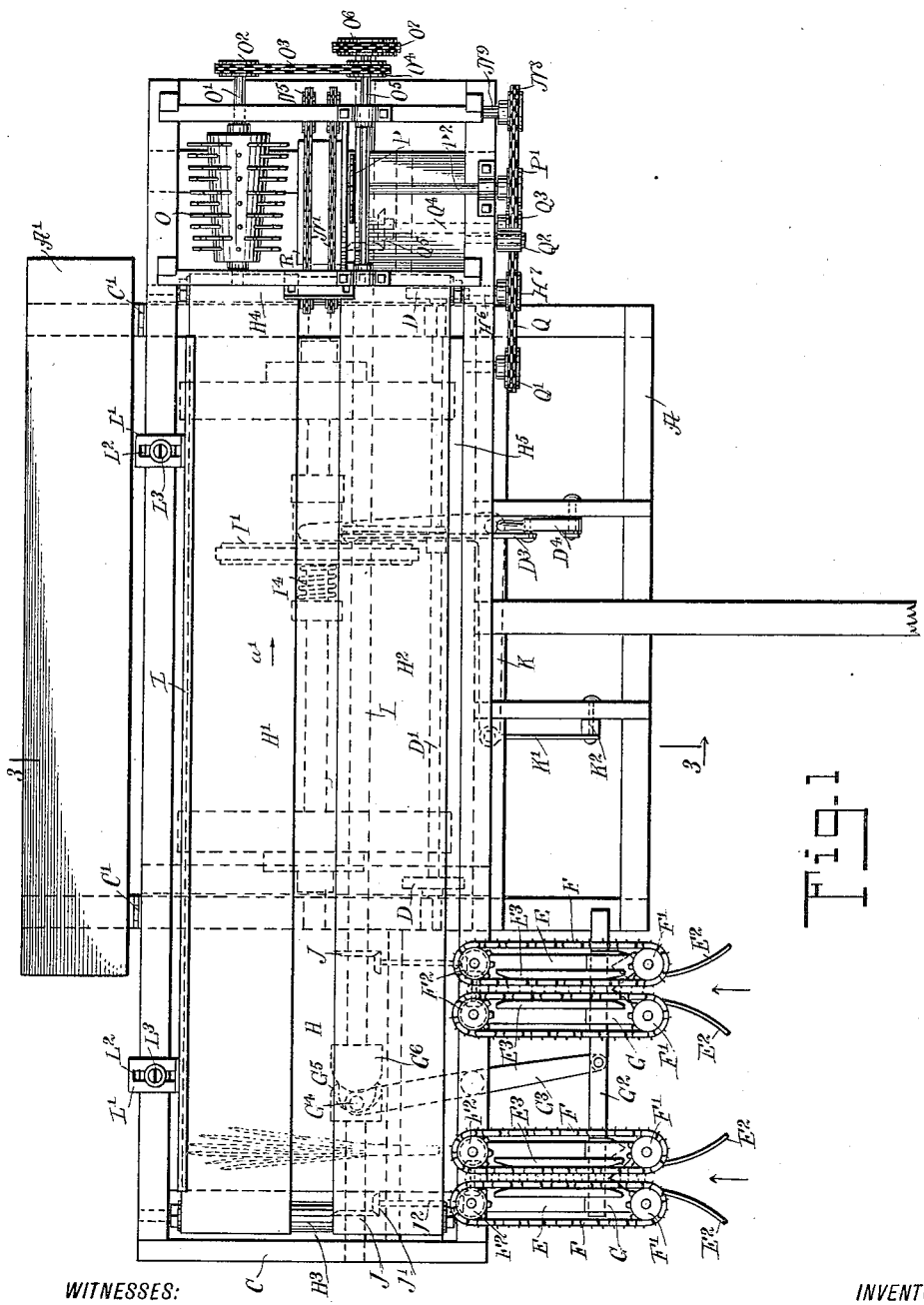
WITNESSES:
INVENTOR
Emuel Cory
BY
ATTORNEYS

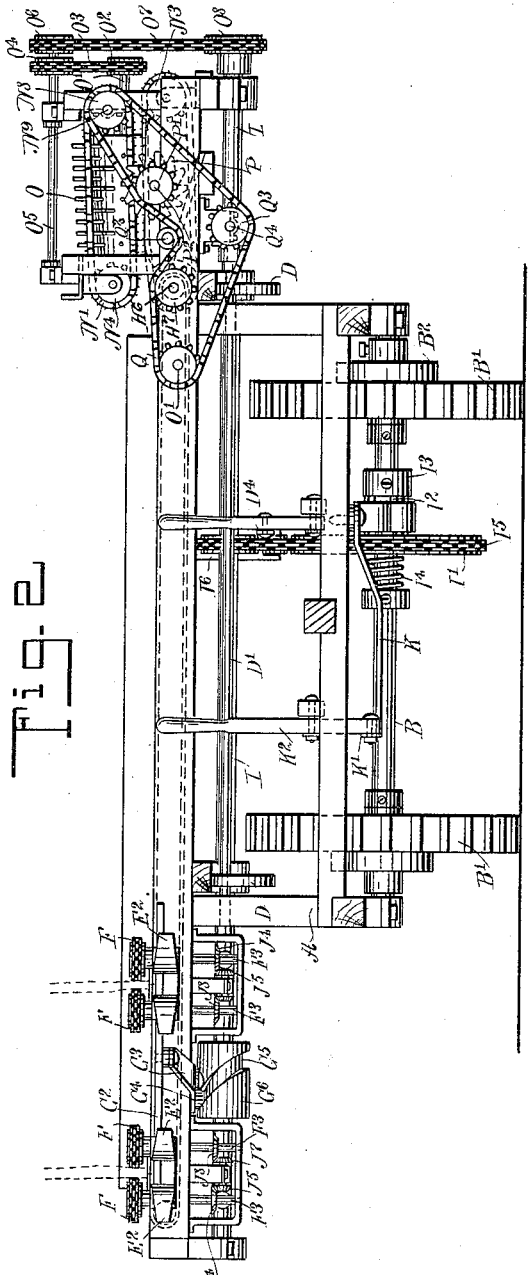

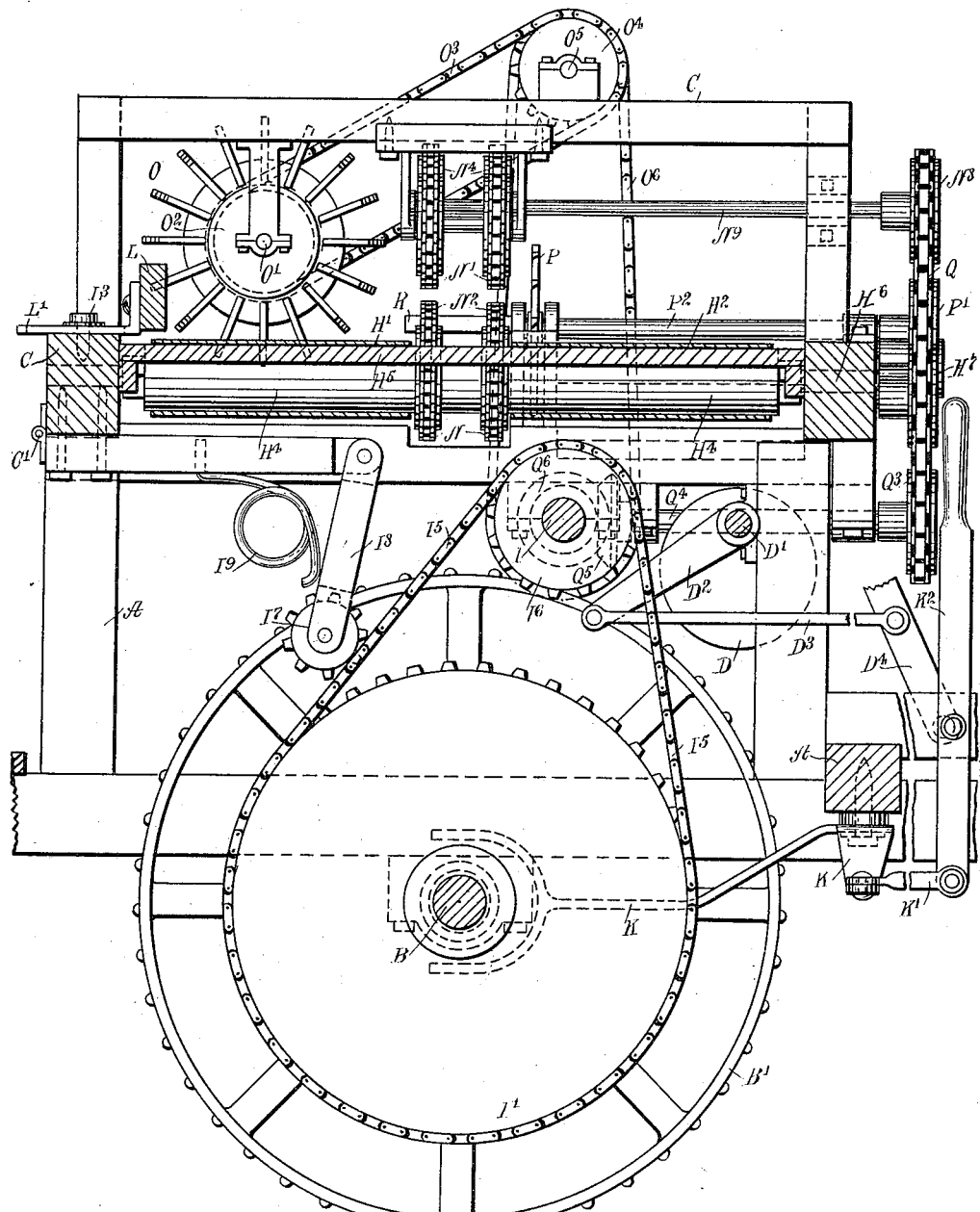

UNITED STATES PATENT OFFICE.

EMUEL CORY, OF COLFAX, INDIANA.

BROOM-CORN-CLEANING MACHINE.

1,064,617.   Specification of Letters Patent.   Patented June 10, 1913.

Application filed December 14, 1910. Serial No. 597,208.

*To all whom it may concern:*

Be it known that I, EMUEL CORY, a citizen of the United States, and a resident of Colfax, in the county of Clinton and State of Indiana, have invented a new and Improved Broom-Corn-Cleaning Machine, of which the following is a full, clear, and exact description.

The object of the invention is to provide a new and improved broom corn cleaning machine, arranged to thresh out the seeds from the heads and simultaneously trim the butts with a view to produce stalks of even length. For the purpose mentioned use is made of a conveyer delivering the even stalks to a gripping and carrying device, which takes hold of the stalks at the middle so that the heads and butts project on opposite sides of the said gripping and carrying device, on one side of which is located a threshing device for removing the seeds from the heads, and on the other side is located a trimmer for cutting off the butts to make the stalks of even length.

A practical embodiment of the invention is represented in the accompanying drawings forming a part of this specification, in which similar characters of reference indicate corresponding parts in all the views.

Figure 1 is a plan view of a broom corn harvesting machine to which the improvement is applied; Fig. 2 is a front elevation of the same; and Fig. 3 is an enlarged transverse section of the same on the line 3—3 of Fig. 1.

The frame A of the harvesting machine is mounted on wheels B' loose on the axle B and connected therewith by clutches $B^2$. On the rear of the frame A is hinged at C' a frame C resting at its forward end on eccentrics D on the shaft D' provided with an arm $D^2$ connected by link $D^3$ with a hand lever $D^4$ under the control of the operator. On the front of the frame C at one side thereof are two devices for gathering the stalks of two rows of broom corn, gripping the same and cutting them off above the ground. Each device has a guideway E terminating in fork members E', to which are secured curved guards $E^2$, adapted to gather the corn in a row and guide the same between the fork members E and between the adjacent runs of two horizontally-disposed toothed sprocket chains F passing around sprocket wheels F', $F^2$, of which the sprocket wheels F' are journaled in the fork members E', while the sprocket wheels $F^2$ are journaled at the front bar of the main frame C. The adjacent runs of the sprocket chains F abut with their inner sides against resistance bars $E^3$ arranged on the top of the guideway E so as to hold the said runs parallel and thereby insure a firm gripping of the stalks between the said runs of the sprocket chains F.

A cutting device for cutting off the stalks a distance above the ground is arranged on the front of the fork members E' of the guideway E between the said fork members and the inner runs of the sprocket chains F, and the said cutting device consists of a fixed V-shaped knife G and V-shaped knives G', secured to a reciprocating cutter bar $G^2$.

On the axle B is mounted to rotate loosely a sprocket wheel I' having a clutch member $I^2$ adapted to engage a clutch member $I^3$ secured on the axle B, the said sprocket wheel I' being pressed in the direction of its axis by a spring $I^4$ to normally hold the clutch member $I^2$ in engagement with the clutch member $I^3$, so that when the axle is rotated a rotary motion is given to the sprocket wheel I'. The sprocket wheel I' is connected by a sprocket chain $I^5$ with a sprocket wheel $I^6$ secured on the shaft I so that the rotary motion of the sprocket wheel I' is transmitted to the shaft I. On the shaft I is secured a bevel gear wheel J in mesh with a bevel pinion J' secured on a shaft $J^2$ journaled in suitable bearings arranged on the main frame C. On the forward end of the shaft $J^2$ is secured a bevel gear wheel $J^3$ in mesh with a bevel gear wheel $J^4$ secured to the shaft $F^3$ of one of the rear sprocket wheels $F^2$ of each gripping device, and the sprocket wheel $J^4$ is also in mesh with a sprocket wheel $J^5$ secured on a shaft $J^6$ journaled on the main frame C and carrying a sprocket wheel $J^7$ in mesh with a sprocket wheel $J^8$ attached to the shaft $F^3$ of the other rear sprocket wheel $F^2$ of the corresponding gripping and carrying device above described. Now when the shaft I is rotated a rotary motion is transmitted by the gearing just described to the shaft $F^3$ of the rear sprocket wheels $F^2$, so that a traveling motion is given to the sprocket chains F for the purpose above described, that is, to grip the stalks and hold the same in an upright position while being cut by the action of the knives G, G′, and to carry the cut off stalks rearward with the butt ends traveling over the top surface of the guideway E until the stalks are finally released from the sprocket chains F to drop transversely onto the conveyer belt H. For the purpose of operating the clutch the sprocket wheel I′ is engaged by a forked lever K pivotally connected by a link with the hand lever $K^2$. A tension wheel $I^7$ on an arm $I^8$ preceded by an opening $I^9$, engages the sprocket chains $I^5$. The sickle bar $G^2$ is reciprocated by means of the lever $G^2$ having at its near end a roller $G^4$ engaging a cam groove $G^5$ in the cam $G^6$ on the shaft I. The conveyer belt H, consists of spaced endless bands H′, $H^2$ passing over rollers $H^3$, $H^4$ journaled in suitable bearings on the main frame C. A table $H^5$ extends between the rollers $H^3$, $H^4$ and is secured to the main frame C, the table $H^5$ forming a support for the bands H′, $H^2$. An evener board L is held adjustably over the band H′ by lugs L′ having slots $L^2$ through which screws $L^3$ pass. At the rear of the frame A is a foot board A′. The stalks are carried by the conveyer belt H in the direction of the arrow $a'$ and are finally delivered by the conveyer belt H between two pairs of sprocket chains N, N′ arranged in vertical planes and adapted to grip the stalks approximately at the middle thereof so that the heads of the broom corn project at one side of the said chains N, N′ and the butt ends project at the other side of the said chains. Now while the stalks are carried along between the pairs of chains N, N′ the heads of the broom corn are passed between the beaters of a threshing drum O, so that the seeds are threshed out of the heads and at the same time the butt ends of the stalks are cut off by a revoluble cutter P located on the other side of the chains N, N′. Thus the broom corn seeds are removed from the heads and at the same time the stalks are cut to uniform length, so that the broom corn on leaving the machine is in proper shape for being formed into brushes and the like.

In order to impart a traveling motion to the pairs of gripping and carrying chains N, N′ the following arrangement is made: The sprocket chains N pass around sprocket wheels $N^2$, $N^3$, and the sprocket chains N′ pass around sprocket wheels $N^4$, $N^5$, the sprocket wheels being journaled in suitable bearings on the main frame C. The forward sprocket wheels $N^2$ are secured to the conveyer belt roller $H^4$, at a point between the bands H′, $H^2$, and on the shaft $H^6$ of the roller $H^4$ is secured a sprocket wheel $H^7$, over which passes a sprocket chain Q which also passes over a sprocket wheel $N^8$ secured on a shaft $N^9$ carrying the sprocket wheels $N^4$ of the upper pair of sprocket chains N′.

Thus when a traveling motion is given to the sprocket chain Q then the conveyer belt H and the pairs of chains N, N′ are simultaneously caused to travel to carry the stalks to the threshing drum O to remove the seeds and to the cutter P for cutting off the butt ends of the stalks, as previously explained. The endless chain Q passes around idlers Q′, $Q^2$ and around a sprocket wheel P′ secured on the shaft $P^2$ of the cutter P so that a rotary motion is given to the cutter P from the chain Q. The sprocket chain Q also passes around a sprocket wheel $Q^3$ secured on a shaft $Q^4$ provided with a bevel gear wheel $Q^5$ in mesh with a bevel gear wheel $Q^6$ secured on the shaft I, so that when the latter is rotated a traveling motion is given to the sprocket chain Q for actuating the belt H, the pairs of chains N and N′ and the cutter P. In order to drive the drum O the shaft O′ thereof is provided with a sprocket wheel $O^2$ connected by a sprocket chain $O^3$ with a sprocket wheel $O^4$ secured on a shaft $O^5$ journaled on the main frame C, and on the shaft $O^5$ is secured a sprocket wheel $O^6$ connected by a sprocket chain $O^7$ with a sprocket wheel $O^8$ secured on the shaft I, so that when the latter is rotated a rotary motion is transmitted to the threshing drum O. A table R extends immediately under the upper runs of the lower pair of chains N so as to properly support the said runs and the stalks thereon while the latter are carried between the pairs of chains for the purpose above set forth.

In the operation of the machine, the stalks are cut and delivered to the conveyer belt H from which they pass to the gripping and carrying device formed by the pairs of chains N, N′, which take hold of the stalks approximately at the middle thereof and carry the heads past the drum O and the butt ends past the cutter P so that the seeds are removed and the stalks are cut to uniform length. The chains N, N′ finally discharge the stalks at the side of the machine into a binder for binding the loose stalks into sheaves.

Having thus described my invention, I claim as new and desire to secure by Letters Patent:

1. In a broom corn cleaning machine, a conveyer, a revoluble threshing drum at the discharge end of the conveyer, the axis of the drum being parallel with the line of travel of the conveyer, a revoluble cutter at the same end of the conveyer and spaced from the threshing drum, the axis of the cutter being at right angles to the line of travel of the conveyer, and two pairs of parallel endless chains, one pair above the other and arranged between the threshing drum and the cutter, the adjacent runs of the endless chains of the pairs of chains being adapted to grip the stalks intermediate of their ends and present the heads to the threshing drum and their butts to the cutter.

2. In a broom corn cleaning machine, a conveyer, two pairs of spaced and parallel endless chains at the discharge end of the conveyer and in alinement therewith, the chains of one pair being one above the other pair and the wheels over which the chains of the lower pair of chains pass at one end being on one of the rollers of the conveyer, whereby the said chains will be operated from the conveyer, a revoluble threshing drum at one side of the chains and having its axis parallel with the line of travel of the conveyer, and a revoluble cutter at the other side of the said chains and having its axis at right angles to the line of travel of said conveyer.

3. In a broom corn cleaning machine, a conveyer, spaced sprocket wheels on the roller of the conveyer, a pair of spaced sprocket wheels above the sprocket wheels of the conveyer roller, a pair of spaced sprocket wheels in front of each pair of the hereinbefore named sprocket wheels, chains passing around said pairs of sprocket wheels, a threshing device at one side of the said chains, a cutter at the other side of the chains, and means for operating the conveyer.

4. In a broom corn cleaning machine, a conveyer, a pair of spaced sprocket wheels on the roller of the conveyer at the discharge end thereof, a pair of spaced sprocket wheels above the sprocket wheels on the conveyer roller, a pair of spaced sprocket wheels in front each pair of the hereinbefore named pairs of sprocket wheels, chains passing around said sprocket wheels, a threshing drum at one side of the chains and having its axis parallel with said chains, a rotary cutter at the other side of the said chains and having its axis at right angles to the chains, and means for operating the upper chains and cutter from the said roller of the conveyer.

In testimony whereof I have signed my name to this specification in the presence of two subscribing witnesses.

EMUEL CORY.

Witnesses:
PRIMER E. SWEET,
D. M. BLUE.

---

Copies of this patent may be obtained for five cents each, by addressing the "Commissioner of Patents, Washington, D. C."